United States Patent [19]
Paulk et al.

[11] Patent Number: 4,831,258
[45] Date of Patent: May 16, 1989

[54] DUAL SENSOR RADIATION DETECTOR

[75] Inventors: Raymond C. Paulk, Hopedale; Francesco Pompei, Wellesley Hills, both of Mass.

[73] Assignee: Exergen Corporation, Natick, Mass.

[21] Appl. No.: 164,136

[22] Filed: Mar. 4, 1988

[51] Int. Cl.[4] ............................................. G01J 5/26
[52] U.S. Cl. .................................. 250/349; 250/338.1; 374/121; 374/125; 374/129
[58] Field of Search ...................... 250/338.1, 349, 342, 250/340; 374/121, 120, 132, 129, 125, 124, 113, 112, 110

[56] References Cited

U.S. PATENT DOCUMENTS

| | | | |
|---|---|---|---|
| 2,392,873 | 1/1946 | Zahl | 250/342 |
| 3,023,398 | 2/1962 | Siegert | 340/51 |
| 3,465,149 | 9/1969 | Flint | 250/338.1 |
| 4,030,362 | 6/1977 | Dimeff | 374/129 |
| 4,121,459 | 10/1978 | MaCall et al. | 73/340 |
| 4,317,998 | 3/1982 | Dore | 250/347 |
| 4,345,840 | 8/1982 | Goetz et al. | 356/407 |
| 4,350,166 | 9/1982 | Mobarry | 128/664 |
| 4,549,814 | 10/1985 | Creel et al. | 374/2 |
| 4,636,091 | 1/1987 | Pompei et al. | 374/124 |
| 4,746,224 | 5/1988 | Mizuno et al. | 374/124 |

FOREIGN PATENT DOCUMENTS

| | | | |
|---|---|---|---|
| 1131914 | 6/1962 | Fed. Rep. of Germany | 374/121 |
| 155976 | 1/1963 | U.S.S.R. | 374/121 |

Primary Examiner—Janice A. Howell
Assistant Examiner—Constantine Hannaher
Attorney, Agent, or Firm—Hamilton, Brook, Smith & Reynolds

[57] ABSTRACT

A radiation detector has a dual element sensor. One sensor element detects thermal radiation of a target at the same time the second sensor element detects thermal radiation of a reference object adjacent to the target. The dual element sensor produces a signal of the difference in the sensed radiations. A remote meter displays the thermal difference and provides an indication of sensed mass of the target relative to the mass of the reference. The display is driven by a circuit which provides a fast response of the sensed thermal difference and a slow decay of the response to provide a somewhat continuous display between targets detected in a series. Alarms may be sounded in accordance with certain readings of the display. A continuously flowing, dynamic pattern of thermal differences is detected and displayed in applications of the detector to assembly line processes.

43 Claims, 6 Drawing Sheets

DUAL SENSOR RADIATION DETECTOR

BACKGROUND OF THE INVENTION

Quality control of a product or process has become a large part of the economics of industry. Two major concerns of quality control are accuracy and the time it takes to detect the slightest mistake in a process. Human resources are heavily relied upon for inspection of various aspects of the production process. A typical inspection procedure is to analyze a sampling of products. Various devices are employed to measure differences in weight, temperature and other dimensions. Such devices and procedures, although accurate for the sample, are usually time consuming and are incapable of giving a dynamic quantitative analysis. Subtle and intermittent defects are often undetected.

Radiation detectors have been used as non-contact alternatives to many temperature sensors and detect abnormalities by measuring thermal changes. In particular, infrared sensing devices are being used to detect temperature differences between a subject and a reference, and to measure heat gain or loss from machinery, plumbing, electrical lines and the like. Typically, radiation sensors respond to changes in thermal radiation in the order of less than 1/10 second. Such sensors are not only fast, but are accurate and economic as operations of interest do not have to be shut down during detection.

However, such radiation detectors have not been used to detect a dynamic pattern of temperatures or temperature changes as is found in assembly lines and conveyer belt type processes. Further, some radiation detectors operate from an internal reference which is built into the sensor itself. Accurate interpretation of the detector's signal requires careful calibration. Such detectors are limited by their calibration, and thus cannot detect subtle changes in radiation outside of the limits of the calibration.

Also, radiation detectors often become dirty and overheated in certain work environments. Elaborate colling, purging and cleaning systems have been used, but are expensive, clumsy and require maintenance to retain proper calibration.

SUMMARY OF THE INVENTION

In the present invention, a radiation detector uses two thermopiles connected in a manner which detects thermal differences between a target and a neighboring area or object which serves as an external reference to the detector. In the preferred embodiment, the center of the reference object is within close proximity of the center of the target. This arrangement is useful for applying radiation detection to conveyer belt processes where a continuously flowing and dynamic pattern in the difference between the thermal radiation sensed by the two thermopiles is sought. The reference is a portion of an object on a conveyer belt which is not to be changed by the process, such as one side of a box top, and the target is the change to the object which is introduced by the process, such as a bead of hot adhesive. The dual sensor detects when the process is not properly done by a break in the continuous pattern of the sensed thermal difference between the unchanged one side of the box top and the intermittently applied adhesive bead adjacent to it.

An electronic circuit is used to balance or calibrate the two thermopiles relative to each other. This ensures accuracy in the dual detection and the generated temperature difference. The circuit includes a fixed gain operational amplifier connected to one thermopile and a variable gain operational amplifier connected to the second thermopile.

A lens system is incorporated within the dual sensor. A lens is used to separate and fix the fields of view of the two thermopiles which allows the device to distinctly focus on a reference and target at various distances. That is, the lens provides a separate and specific field of view for each thermopile. The lens may comprise germanium to filter out waves of wavelengths outside the range of about 1.5 microns to about 21 microns. Further filter means may be used to allow wavelengths of about 8 microns to about 13 microns to be sensed by the two thermopiles.

The dual element sensor is connected to a remote meter and control unit for providing a visual display of the continuous pattern of sensed thermal difference and of the changes in that pattern. In other words the display provides an indication of the dynamic pattern of thermal differences of the heat radiation sensed by the two thermopiles.

In accordance with one aspect of the present invention, the meter provides a display of the amount of adhesive applied to the object being processed due to the sensed radiation being proportional to the mass of the adhesive. The display is a bar graph arranged in segments of different colors. One segment indicates detection of a decreased amount of applied adhesive with respect to a predetermined minimum amount. Another segment indicates detection of an amount of applied adhesive which is above the predetermined minimum amount. Between those two segments, the display provides an indication of detection of an acceptable amount of applied adhesive.

Two sets of three LED's are positioned on opposite sides of the side of the meter unit on which the bar graph is positioned. The three LED's of each set correspond to the bar graph. This enables the user to view the meter unit from three different sides and obtain an indication of the sensed thermal difference. Preferably, one LED of each set and one level of the bar graph corresponds to a sensed thermal difference of about 50% of a predetermined minimum thermal difference. A second LED of each set and a second level of the bar graph corresponds to a sensed thermal difference of about 100% of the predetermined minimum. A third LED of each set and a third level of the bar graph corresponds to a sensed thermal difference of about 150% of the predetermined minimum.

In addition, the bar graph display is driven by a circuit which provides a quick initial response to the sensed thermal difference and a relatively slow decay of the response to each sensed target. Optionally, an analog output may be provided before the circuit which drives the display.

A further design feature of the bar graph display provides one LED which remains illuminated for sensed thermal differences above a preset amount when the reference sensing thermopile is sensing the target area and the target sensing thermopile is sensing the reference area. This allows the user to know that the unit is at least powered.

In one feature of the present invention, the sensitivity of the dual detector is user adjustable independent of an amplification offset applied to the sensed thermal difference signal of the thermopiles. This is accomplished through an electronic circuit which offsets voltage of amplifiers of the sensed thermal difference signal before gain is applied to the signal to adjust sensitivity of the detection system.

In another feature of the invention, a separate return ground line is used from the dual element sensor to the meter and control unit. This ensures a common zero volt reference for both the dual element sensor and the meter and control unit.

A housing of the dual element sensor provides a thermally stable environment about the two thermopiles so that the thermopiles sense thermal radiation of the target area and reference object uninfluenced by thermal radiation within the housing. This is largely accomplished by the housing maintaining the thermopiles at the same temperature as each other and the interior of the housing. Also, the walls of the housing and the lens are preferably thermally conductive.

In particular, the housing has a main cylindrical piece with a hexagonal cross-section, an outer brass tube positioned coaxially within the main housing piece, an inner brass tube positioned coaxially within the outer brass tube, and a thermally conductive sleeve positioned coaxially within and in thermal contact with the inner brass tube. Coaxial plastic tubings serve as thermal layers between the outer brass tube and the main piece, and between the inner brass tube and the outer brass tube. The conductive sleeve houses the thermopiles in one end of the sleeve interior and provides a heat sink at an opposite end. The heat sink extracts heat from the thermopiles so that the thermopiles are maintained at the same temperature as the interior of the sleeve.

The heat sink of the sleeve is preferably formed by a series of cylindrical walls decreasing in diameter from the opposite end of the sleeve through which the thermopiles sense the subject thermal radiation. The cylindrical walls decreasing in diameter funnel thermal radiation to-be-sensed toward the thermopiles while extracting excessive heat from the thermopiles.

In an optional design of the present invention, air is pumped through the sensor unit from behind the two thermopiles and exhausts across the face of the lens. This prevents dirt and dust from entering the unit housing and collecting on the lens in the unit housing in front of the two thermopiles. The air flow may also be at a rate which cools the sensor unit to prevent the unit from overheating.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

In the present invention, the heat or thermal radiation of a target and that of a neighboring reference object are simultaneously sensed by a dual-element sensor. The dual detection generates a signal which indicates the thermal difference between the sensed target and reference radiation. Where there is a series of targets and respective references, as in an assembly line or conveyer belt process, the dual element sensor detects a dynamic pattern of the thermal differences between the targets and respective references. Employing this dual detection in the quality control of the conveyer belt or similar process, a temperature difference is sensed between a target area which is effected by the process and an adjacent reference object which is left uneffected by the process. Hence, the sensed thermal difference is a measurement of the effect of the process on the target object.

A remote display unit, receiving the generated signal from the dual element sensor indicative of the sensed thermal difference, provides a quantitative indication of the sensed thermal difference and hence provides an indication of the effect introduced by the process. At threshold thermal differences, the display unit optionally controls audial or other indications in addition to a visual indication of the sensed thermal difference.

Figure 1:
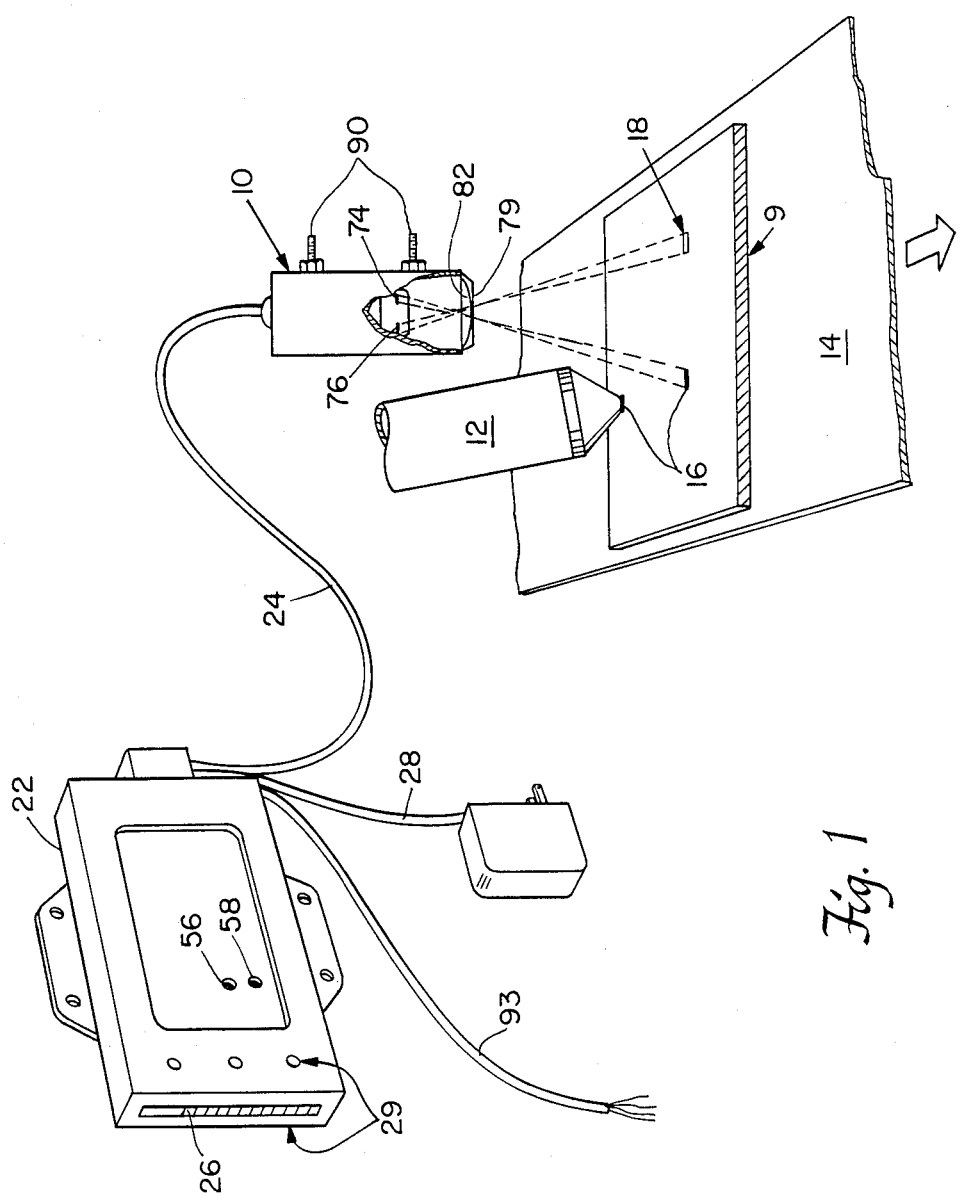
FIG. 1 is a schematic view of an embodiment of the present invention with a partially broken away dual sensor unit.

A particular embodiment of the present invention adapted to quality control testing of a hot adhesive application process is shown in FIG. 1. A hot adhesive dispenser 12 applies adhesive 16 onto a substrate 9, such as a portion of a box top or other packaging piece. A dual element sensor 10 is mounted beside and downstream of the dispenser 12, and houses thermopiles 74 and 76. Through a lens 82 and aperture 79 in one end of sensor 10, thermopile 74 detects the thermal radiation of the dispensed adhesive target 16 and thermopile 76 detects the thermal radiation of the adjacent reference portion 18 of the substrate 9 which does not have adhesive applied to it. The dual element sensor 10 produces a signal of the thermal difference between the detected adhesive and substrate reference area. This signal is transmitted to remote display meter 22 by line 24. Meter 22 provides an LED bar graph display 26 of the sensed thermal difference and provides 2 sets of 3 LED displays 29 on opposite adjacent sides of the bar graph display 26. Hence, an indication of sensed heat flux can be seen by the user from three different sides of display meter 22.

Whenever adhesive is not detected by thermopile 74, a change in the produced thermal difference occurs. This change in sensed thermal difference is indicated by the LED bar graph 26 displaying a different reading, and optionally by meter 22 energizing a switch through alarm control line 93 to stop the conveyer belt 14 or sound an alarm, or the like. If adhesive is being dispensed by individual beads and not in a stream line fashion, then the dual element sensor 10 and bar graph 26 provide a changing or dynamic pattern of detected thermal differences. The display 26 shows a thermal difference where beads are occurring periodically, and a lower thermal difference where beads do not occur or are not uniform. The time delay of sensing and displaying an indication of thermal difference between beads is user adjustable through response control access hole 58.

Furthermore, the amount of heat radiated from the adhesive relative to the amount of heat radiated from the substrate reference area is directly proportional to the mass of the applied adhesive. Thus the same sensed heat flux which provides a thermal difference also provides relative measurement of the mass of the adhesive dispensed.

Display meter 22 is powered through power line 28. The end of power line 28 opposite meter 22 has provisions to be connected to a standard single phase AC source which powers the dual element sensor 10 and remote display meter 22.

As previously mentioned, alarm control line 93 provides for an optional feature. The end of line 93 opposite meter 22 may be attached to the control system of the conveyer belt or an alarm system. When a predetermined threshold thermal difference is sensed by sensor unit 10, the display meter 22 activates a solid state, bipolar control contact switch function at the end of line 93.

Figure 2A:
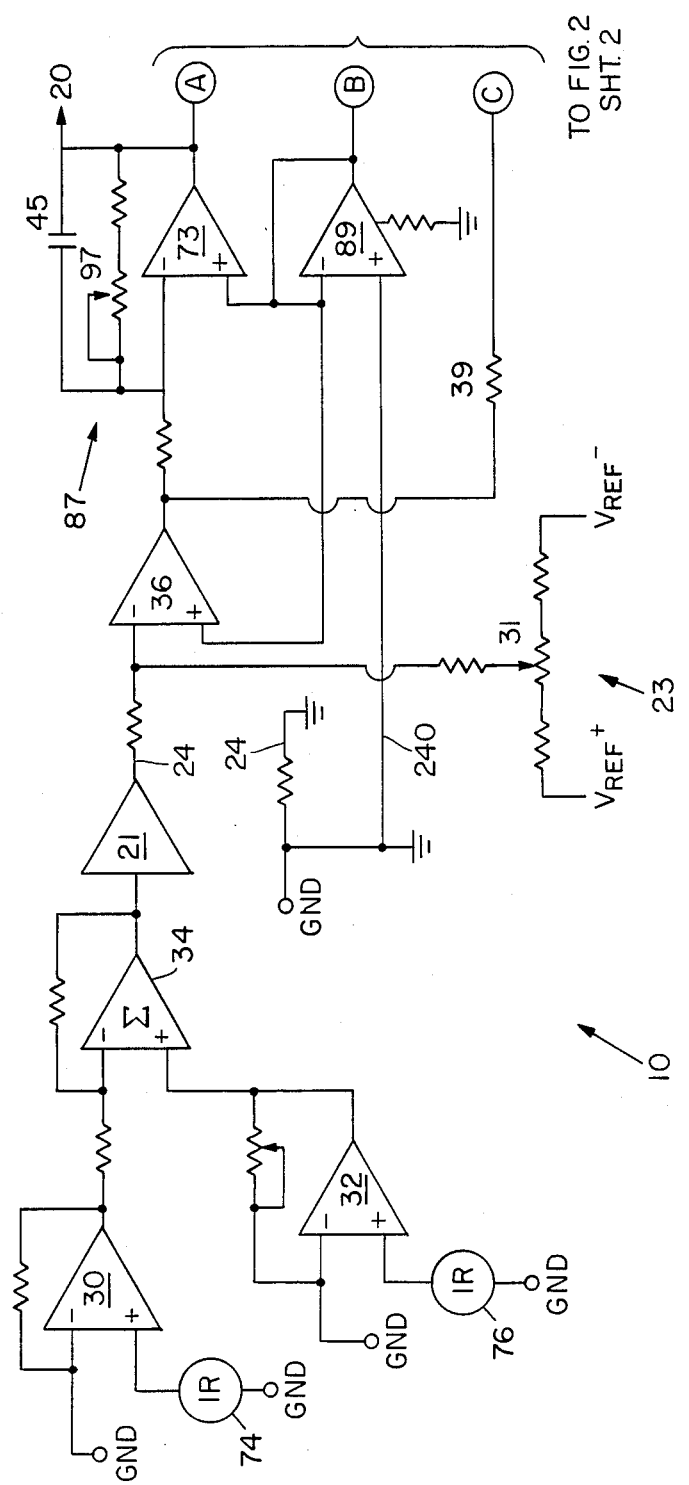
FIGS. 2a and 2b are schematic diagrams of the electrical circuit of the detector of FIG. 1.
Figure 2B:
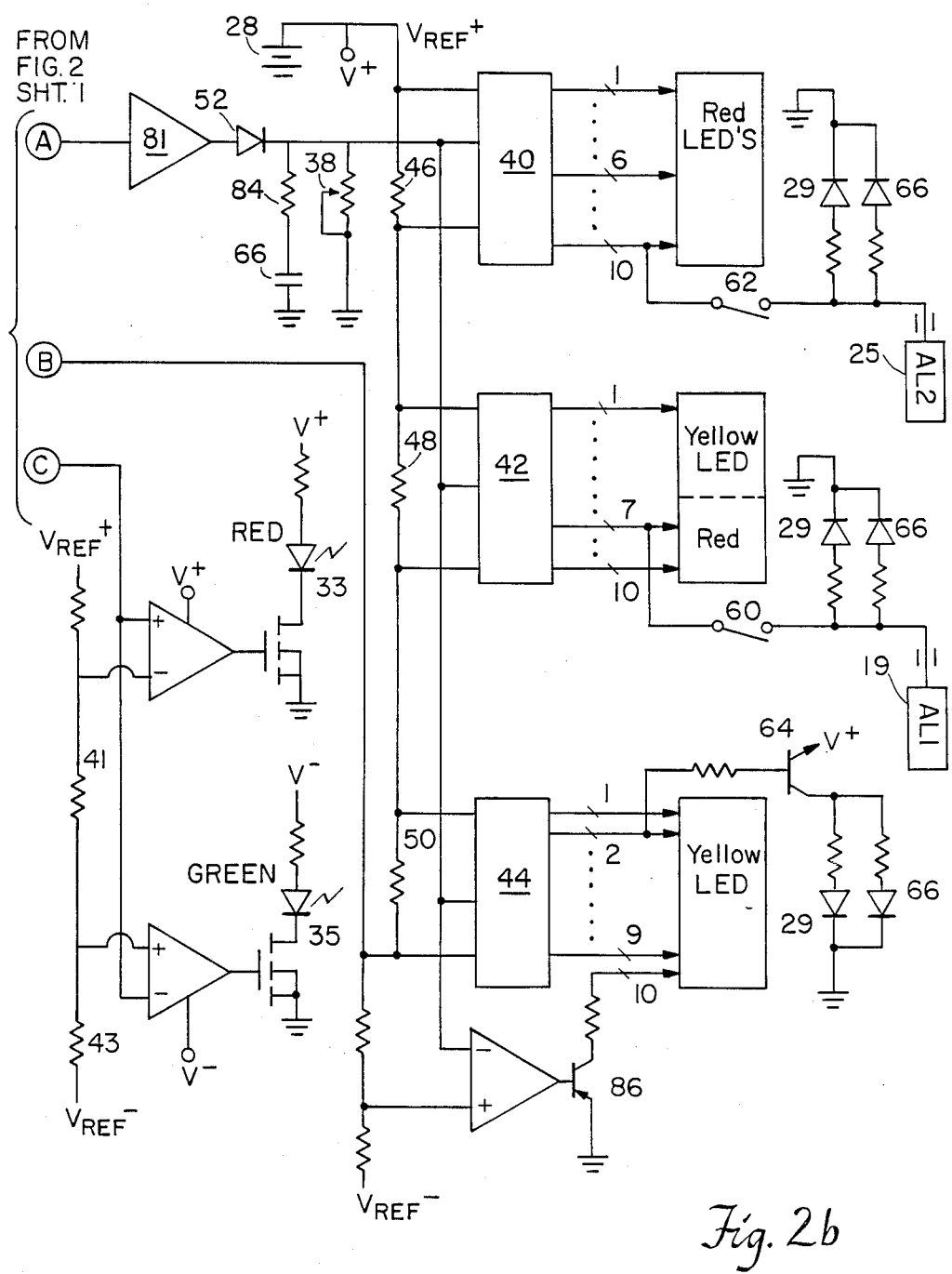

Schematic diagrams of the electrical circuits used in dual element sensor 10 and remote display meter 22 are provided in FIGS. 2a and 2b. As shown in FIG. 2a, the schematic diagram of the electrical circuit of dual sensor unit 10, thermopiles 74 and 76 are respectively connected to operational amplifiers 30 and 32 which amplify the signals produced by the thermopiles. Op amp 30 is a fixed gain amplifier while op amp 32 is a variable gain amplifier. The variable gain allows for the balancing or calibrating of the amplification to thermopile 76 relative to that of thermopile 74 through op amp 30. Such a balancing of the two signals through op amps 30 and 32 corrects any differences between thermopiles 76 and 74.

The balanced and amplified signals provide the inputs to comparator 34. The output voltage of comparator 34 produces the signal indicative of the sensed thermal difference. The sensed thermal difference signal is then amplified in op amp 21 to produce a sensor output signal of 5 MV per BTU/HR/SQ FT of sensed thermal difference.

This sensor output signal is carried by sensor signal line 24 to fixed gain amplifier 36 within display meter 22 where the remaining part of the electrical circuit is housed as shown in FIG. 2b. Typically amplifiers inject a D.C. voltage or offset which varies from unit to unit. Consequently, it is desirable to adjust this offset to produce a more accurate indication of sensed temperature difference. Circuit 23 accomplishes this by offsetting the voltage of op amp 21 so that the output of amplifier 36 is a true sensed thermal difference signal.

Offset circuit 23 is adjusted by the manufacturer through its potentiometer 31. First, the dual sensor unit 10 is covered by a highly reflective target so that the thermopiles 74 and 76 will produce little or no output. When offset voltage across resistor 39 is greater than that across resistors 41 and 43, red LED 33 is illuminated indicating to the manufacturer that the offset voltage is set too high. Likewise, when offset voltage across resistor 39 is less than that across resistor 43 green LED 35 is illuminated indicating the offset is set too low. Potentiometer 31 is adjusted accordingly until neither green LED 35 nor red LED 33 is illuminated which indicates that the offset has been nullified.

With the offset compensated, sensed thermal differential output signal of amp 36 is amplified by gain circuit 87. Gain circuit 87 provides the sensitivity of the detector which is user adjustable through access hole 56 of FIG. 1. Through access hole 56, the user adjusts potentiometer 97 which increases and decreases the gain.

Gain circuit 87 has been unconventionally placed after offset circuit 23. In the past, gain was applied to the sensor signal to adjust sensitivity of the device and the offset was applied after the gain. This posed the problem of the user having to adjust the offset after adjusting the gain and working back and forth between the offset and gain because the two acted interdependently of each other. With gain circuit 87 following offset circuit 23, the double adjustment problem is solved.

Capacitor 45 of gain circuit 87 filters noise produced by the gain. Because more filtering is needed at higher gain values, capacitor 45 is connected to amplifier 73 in parallel with potentiometer 97. Connected this way, higher gain results in higher filtration.

An analog output 20 of the thermal difference signal is provided after gain circuit 87 and before inverting amp 81. The analog output 20 enables a conventional analog display of the sensed thermal difference between the target adhesive and reference area where each 10 mv of output signal is indicative of one percent thermal difference.

The sensed thermal difference signal changes from a negative voltage to a positive voltage through inverting amp 81. The positive sensed thermal difference signal is then passed through diode 52 to charge capacitor 66. A resistor 84 is connected in series with capacitor 66, and capacitor 66 is relatively small which causes the capacitor to charge quickly. This results in a fast response of the bar graph display 26 through drivers 40, 42, 44. The response is fast enough so that the peak of the sensed thermal difference is displayed for each bead of adhesive.

When intermittent areas between beads of adhesive are sensed, no positive signal is passed from inverting amp 81 to diode 52. The diode 52 then closes due to the voltage on the capacitor side of the diode being greater than the voltage on the inverting amp 81 side of diode 52. The capacitor 66 slowly discharges and provides a decreasing voltage to display drivers 40, 42, 44 which in turn causes the bar graph display 26 to decay from the initial peak response. The decay of the display is prevented from reaching predetermined alarm conditions before a succeeding bead is detected.

The rate of decay is user adjustable by potentiometer 38 through which the decreasing voltage is passed from capacitor 66 to drivers 40, 42, 44. Response control access hole 58 of FIG. 1 provides user access to potentiometer 38. It is preferred that the decay time be greater than the time spacing between targets (i.e. beads of adhesive) processed on the conveyor belt in order to integrate and maintain a continuous reading on bar graph display 26 despite the intermittent detection of adhesive beads. Detector 20 of FIG. 1 has an adjustable decay time ranging from about 0.010 seconds to about 10 seconds between targets (i.e. beads of adhesive).

In sum, inverting amp 81 connected in series with diode 52, plus resistor 84, capacitor 66 and potentiometer 38 form a circuit which provides a fast-attack, slow-decay display. Such a display is similar to a conventional sample and hold type display. However, a true sample and hold display can not be obtained because no extra timing input exists for a sampling circuit to hold for each sensed bead.

The sensed thermal difference signal is applied to display drivers 40, 42 and 44. The drivers 40, 42, and 44 also have inputs from a voltage divider of resistors 46, 48 and 50 which divides the reference voltage from a reference voltage generator. With low thermal differences, the voltage output of amp 36, and hence voltage input to drivers 40, 42, 44, is less than that across resister 50 and none of the drivers illuminate any of their respective LEDs. Only a first yellow LED is illuminated by the closing of switch 86 during initial detection of a thermal difference. The first yellow LED remains illuminated for sensed thermal differences above a predetermined minimum thermal difference between the reference thermopile 76 sensing the hotter temperature and the target thermopile 74 sensing the cooler temperature. Hence, when the first yellow LED is not illuminated, the user is notified that the device is not correctly oriented with thermopile 76 sensing the target or hotter area. Further, such illumination of the first yellow LED signifies to the user that the device is powered.

With increasing sensed thermal differences the voltage input to driver 44 from response control 38 is greater than that across resistor 50 and driver 44 illuminates, in an add on fashion, the nine remaining yellow LED's in a first section of bar graph display 26. Each LED is illuminated with each incremental increase in sensed thermal difference until all nine remaining yellow LED's are illuminated.

At higher sensed thermal differences, the voltage input to driver 44 and 42 matches that across resistor 50. Driver 44 continues to illuminate the 9 remaining yellow LED's in the first section of bar graph 26, and driver 42 illuminates 6 more yellow LED's in an add on fashion. Each of these yellow LED's is in a second section of the bar graph display 26, and each LED is illuminated in turn with each incremental change in sensed thermal difference.

At even higher sensed thermal differences, the voltage input to driver 42 causes driver 42 to illuminate four red LED's, one with each incremental increase in sensed thermal difference. This completes the illumination of the second section of bar graph 26.

At very high relative sensed thermal differences, the voltage input to driver 40 surpasses that across resistors 48 and 50 at a low end and surpasses that across resistors 48, 50 and 46 at a high end. Driver 40 illuminates one additional red LED, up to 10 red LED's for each incremental change in sensed thermal difference between the high and low end voltages.

The incremental change in sensed thermal difference per each LED is preset by the sensitivity adjustment (i.e. gain circuit 87) of the display meter unit 22. Sensitivity may be set between about 0.2 BTU's to about 10 BTU's of sensed radiation difference per LED by gain circuit 87 of FIG. 2 through user access hole 56 in FIG. 1 as previously discussed.

The continuously flowing, dynamic pattern of sensed thermal differences, as indicated on bar graph 26, provides an indication of a proportional amount of sensed applied adhesive to a preset acceptable amount of applied adhesive. The range of acceptable amounts of adhesive is preset to correspond with the yellow and red LED's of the second section of bar graph 26. When the sensed amount of adhesive is within the preset range of acceptable amounts of adhesive, the sixteen yellow LED's plus one red LED up through the first eight red LED's are illuminated. When the sensed amount of adhesive is below the range of acceptable amounts of adhesive, all sixteen yellow LED's or less are illuminated with no red LED's illuminated. When the sensed amount of applied adhesive is above the range of an acceptable amount, the remaining red LED's of the third section of bar graph 26 are illuminated in addition to the first eight red LED's and sixteen yellow LED's with alarm switch closures 60 and 62 at the first and ninth red LED respectively.

It is preferred to set a predetermined minimum amount of sensed thermal difference at the first red LED and to label that LED the "100%" level of the bar graph display 26. A 50% sensed amount of the predetermined minimum is then indicated by the illumination of the first nine yellow LED's of driver 44 and switch 86. A 150% sensed amount is indicated by the illumination of the ninth red LED of the bar graph which is the fifth red LED of the section of the bar graph driven by driver 40.

Alarm control switches 19 and 25 are respectively triggered with the illumination of the first red LED by driver 42 at 100% and the ninth red LED by driver 40 at 150%. In a preferred embodiment, the voltage input to driver 42 at the 100% point is about 640 mv which signifies a sensed amount of radiation of between 3.2 BTU's to 120 BTU's depending upon the position of the sensitivity adjustment. The current drawn through the first red LED illuminating it also closes switch 60 which enables alarm control switch 19 and illuminates two red LED's, one in each set of side displays 29 of FIG. 1. Similarly, when the voltage input to driver 40 is about 960 mv signifying a sensed amount of radiation of about 4.8 BTU's to 240 BTU's depending upon the position of the sensitivity adjustment, switch 62 is closed by the current drawn through the respective red LED and alarm control switch 25 is triggered. Further, two additional red LED's are illuminated, one in each set of side displays 29 of FIG. 1.

When the voltage input to driver 44 is about 320 mv, signifying a sensed amount of radiation of about 1.6 BTU's to 80 BTU's, switch 64 is closed by the current drawn through the respective yellow LED of bar graph display 26 and alternate view yellow LED's of side displays 29 of FIG. 1 are illuminated on opposite sides of display meter 22.

LED bar graph display 26 not only provides a relative quantitative or percentile measurement of sensed thermal difference between the applied adhesive and substrate reference area but also provides an indication of the mass amount of adhesive applied. The amount of heat radiated by the applied adhesive relative to the reference is proportional to the mass of the applied adhesive as well as its temperature. Hence, when a smaller amount of adhesive is applied by dispenser 12, a smaller amount of radiation is detected. In turn, the thermopiles 74 and 76 sense a smaller thermal difference which is indicated on the bar graph display 26. The reverse applies when a larger amount of adhesive is dispensed and subsequently sensed. Likewise, the change in sensed thermal difference is proportional to the change in mass of applied adhesive. Thus, the same percentage labels of 50%, 100% and 150% apply to sensed mass difference in the same manner as the labels apply to sensed thermal difference. The bar graph display 26 therefore also provides an indication of the relative mass amount of adhesive applied.

A separate power return ground line 240 is used to provide the dual element sensor unit 10 and the display meter 22 with the same electrical ground as shown in FIGS. 2a and 2b. The power return line (part of sensor line 24) from the sensor unit 10 which would typically be used to provide the same ground carries a current and experiences a voltage drop due to losses in the about ten foot long cable 24. Hence the power return line is unable to provide a true common ground for both the sensor unit 10 and the circuits of display meter 22. On the other hand, due to high input independence of operational amplifier 89 in FIG. 2b, separate return ground line 240 does not carry a current and does not experience a voltage drop from sensor unit 10 to display meter 22, and thus provides the common ground for the dual sensor unit 10 and display meter 22.

In order for the above described sensing to be accomplished with greatest sensitivity, thermopiles 74 and 76 must be well focused on their respective adhesive and reference areas. Hence, thermopiles 74 and 76 have specific and discrete fields of views which exclude as much of the extraneous, unwanted, and/or overlapping surroundings of each target and reference area as possible. Each field of view forms a rectangular cone emanating from the dual element sensor 10. A plan view of the rectangular areas 94, 96 sensed by thermopiles 74 and 76 respectively is provided in FIG. 3a. The farther the sensor 10 is from substrate 9, the larger the sensed areas 94, 96 (i.e. dimensions A,B) and the separation, C, between the sensed areas become. The general mathematical expressions of the dimensions of the sensed areas are as follows:

$$\text{sensed area width, } A = \frac{0.4D}{R}$$

$$\text{sensed area length, } B = \frac{3.0D}{R}$$

$$\text{Sensed areas separation } C = \frac{1.4D}{R}$$

where D is the distance between the lens 82 of FIG. 1 at the aperture end of sensor 10 and the substrate 9; and R is the distance-to-spot ratio of the sensor 10.

Typically, the distance to spot ratio, R, of sensor 10 is 10:1. This ratio is related to the lens-to-thermopile distance V and the lens to object distance D by:

$$\frac{V}{i} = \frac{D}{s} = R$$

where
 V is the distance at which the lens 82 of FIG. 1 produces a focused image of the detected objects of thermopiles 74, 76;
 i is the nominal dimension of the focused image at thermopiles 74, 76; and
 s is the nominal dimension of the sensed object.

Figure 3B:
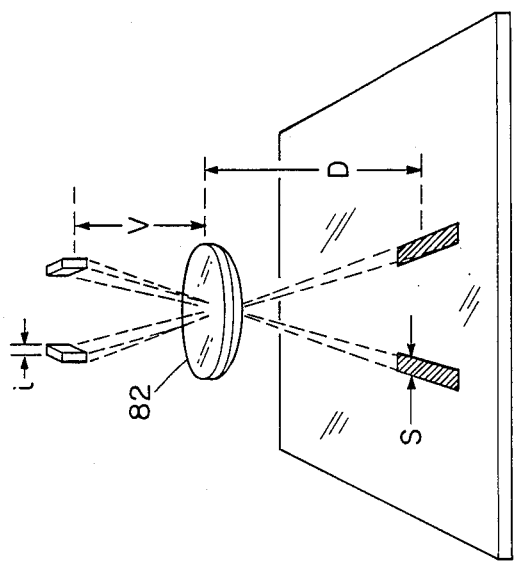
FIGS. 3a and 3b are plan and side views respectively of the field of view of the dual element sensor of FIG. 1.
Figure 3A:
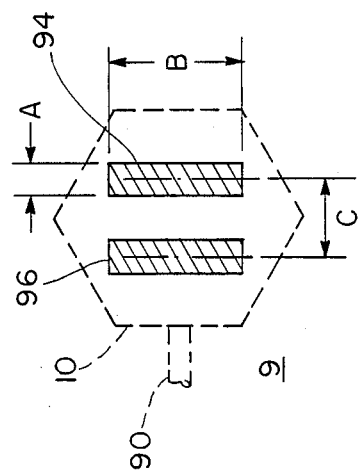

FIG. 3b provides a schematic view of the foregoing relationships. Thus, in the preferred embodiment, thermopiles 74, 76 are positioned about 10 mm from the midpoint of lens 82 which has a focal length of about 8.33 mm.

Figure 4:
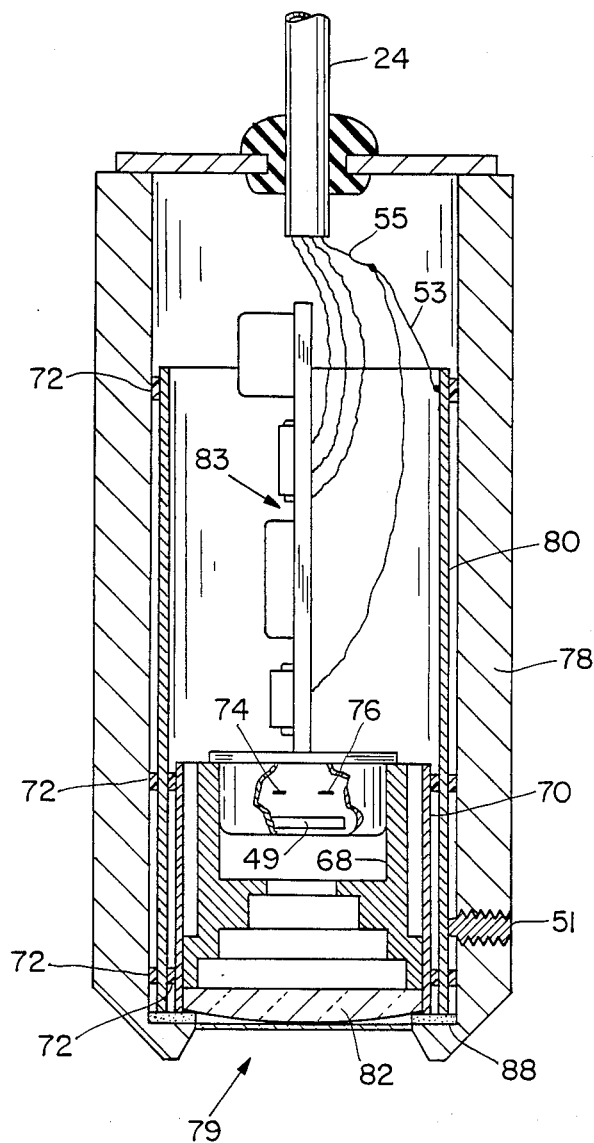
FIG. 4 is a longitudinal section of the dual element sensor of FIG. 1.

The thermopiles 74, 76 and lens 82 are held at the respective desired positions by a housing assembly shown in longitudinal section in FIG. 4. The outer housing 78 of sensor 10 is generally cylindrical with a hexagonal cross-section. The length of housing 78 is about 3.75 inches and a measurement across the flats of the cross-section is about 0.875 inch.

Aperture 79 in one end of outer housing 78 is the opening through which heat radiation is detected by sensor 10. Lens 82 just inside housing 78 at the aperture end provides the optics through which thermopiles 74 and 76 detect the radiation emitted from the target and reference areas respectively.

Thermopiles 74 and 76 are housed in aluminum sleeve 68 which has a stepped opening at one end and a plain cylindrical opening at the other. The end with the plain opening receives the thermopiles 74 and 76 during assembly. The stepped end opens away from thermopiles 74 and 76. The stepped opening in sleeve 68 is shaped to receive and funnel incoming heat radiation toward the thermopiles 74 and 76. Further, the stepped shape is highly absorbent of the unwanted heat radiated into sensor 10. Sleeve 68 may be made of highly conductive material other than aluminum.

Aluminum sleeve 68 fits coaxially within brass inner tubing 70. A cylindrical outer step in sleeve 68 contacts and provides a conductor path to the brass inner tubing 70. This conduction path prevents overheating of the thermopiles 74 and 76, and thermally stabilizes the environment surrounding the thermopiles which in turn ensures accurate sensing.

In addition, lens 82 is bonded to sleeve 68 and inner tube 70 to insure thermal stability. Just inside housing 78 is a fiber washer 88 which aids in heat management between the outer housing 78 and lens 82.

Inner tubing 70 fits coaxially within brass outer tubing 80. Outer tubing 80 fits coaxially within outer housing 78. Coaxial plastic tubings 72 serve as thermal layers between inner tubing 70 and outer tubing 80, and between outer tubing 80 and outer housing 78. Plastic tubings 72 provide a separation between the thermally stabilizing inner tubing 70, outer tubing 80 and housing 78.

Like those of FIG. 2a, electronics 83 are connected to the thermopiles 74, 76 at the plain end of sleeve 68 away from lens 82. A wire 53 is connected from the shield 55 of the signal wire to an end of outer brass tube 80 opposite the aperture end of housing 78. A stainless steel screw 51 is positioned within and near the aperture end of outer housing 78 and in contact with brass outer tube 80, to provide an electrical bond from housing 78 to outer tube 80.

The foregoing described housing assembly provides a thermally and electrically stable environment in which the thermopiles 74, 76 operate. The housing assembly also maintains thermopiles 74, 76 at the same temperature as each other and the interior of the housing. The thermally stable environment enables the thermopiles 74, 76 to obtain wide thermal difference detection of objects outside the housing 78 and limited detection of the interior of the housing 78 so that any internal heat does not contribute to the displayed reading. Further, such a design makes sensor 10 sensitive to long term as well as rapid changes in thermal differences of the objects of interest.

In addition, lens 82 and the interior walls of sleeve 68 serve as thermal conductors of any absorbed heat or radiant energy to which the thermopiles 74, 76 are exposed. The heat is drawn away from thermopiles 74, 76 by lens 82 and sleeve 68, conducted from sleeve 68 and lens 82 to brass inner tube 70, and subsequently conducted to brass outer tube 80 through plastic tube layer 72. The coupling of plastic tube layers 72 to inner brass tube 70 and outer brass tube 80 provides greater mass and surface area, and thereby gradual thermal change. The outside of housing 78 is chrome plated to further ensure thermal stability of sensor unit 10 by reflecting any external heat from the surroundings.

The closer thermopiles 74 and 76 are to the aperture end of housing 78, the farther apart the target and reference may be from each other and the farther away the target and reference may be from the aperture end of sensor 10 and still be in focus to the thermopiles 74 and 76. Other designs of the invention with the dual thermopiles closer to or further from the lens and aperture are possible. For instance, a design with the thermopiles farther from the lens such that distance-to-spot ratio is 18:1 allows the reference and target areas to be closer together and smaller than the standard 10:1 assembly previously addressed depending on the distance between the substrate and sensor unit.

Similarly the sensor is mounted at the corresponding focused distance D from the target area depending on the designed distance V at which the target is focused on the dual thermopiles. Generally, focused distance D will be in the range of about 1.5 inches to about 5 inches. Also, a lens of focal length between about 8.33 mm to about 16.67 mm is suitable with the distances V and D being adjusted accordingly with respect to the focal length of the lens.

Further, some applications may necessitate filtering of a certain ban width of waves for more accurate detection. In that case, lens 82 comprises germanium due to its high transparency to principle infrared wavelengths. Furthermore, filter lens 49 of FIG. 4 located directly in front of thermopiles 74 and 76 filters the thermal radiation to only those infrared waves in the 8 to 13 micron wavelength. Hence, lens 82 when made of germanium together with filter lens 49 provides thermopile detection of infrared light waves independent of visible light waves.

Similarly, the lens near aperture end of the sensor unit of other spot-to-ratio designs may comprise germanium to filter waves of about 2 microns to about 20 microns wide.

The dual element unit 10 must be properly oriented during mounting such that the thermopile which is to sense the target area is focused on the target area. Proper orientation of the dual element unit is signified by maximum display illumination. As previously mentioned, the first yellow LED is extinguished if sensor 10 is oriented backwards and the sensed reference temperature is 100% of the predetermined minimum temperature difference higher than the sensed target temperature. To further aid in mounting the dual element 10 unit with proper orientation, various decals, external markings, studs and the like are attached to respective sides of the unit housing.

In a preferred embodiment, two studs 90 (shown in FIG. 1) are attached on the side of the housing which represents the reference side of the dual element unit. The studs also provide means of attachment to a bracket which supports the unit 10 above the target and reference area of interest and adjacent to the adhesive dispenser.

Cold glues can be treated similarly to hot melt adhesive applications, only the dual element sensor unit must be mounted "backwards" of the foregoing discussion so that the reference thermopile senses the glue and the target thermopile senses the unaffected area. Also, cold glues require an amount of time after being dispensed for the solvent to evaporate enough to cause a wet bulb cooled temperature. Hence the sensor unit, unlike in the hot adhesive application, must be mounted at a distance downstream of the glue dispenser.

All other details of sensing and displaying temperature difference of a cold glue process is the same as that described for the hot adhesive application.

Figure 5:
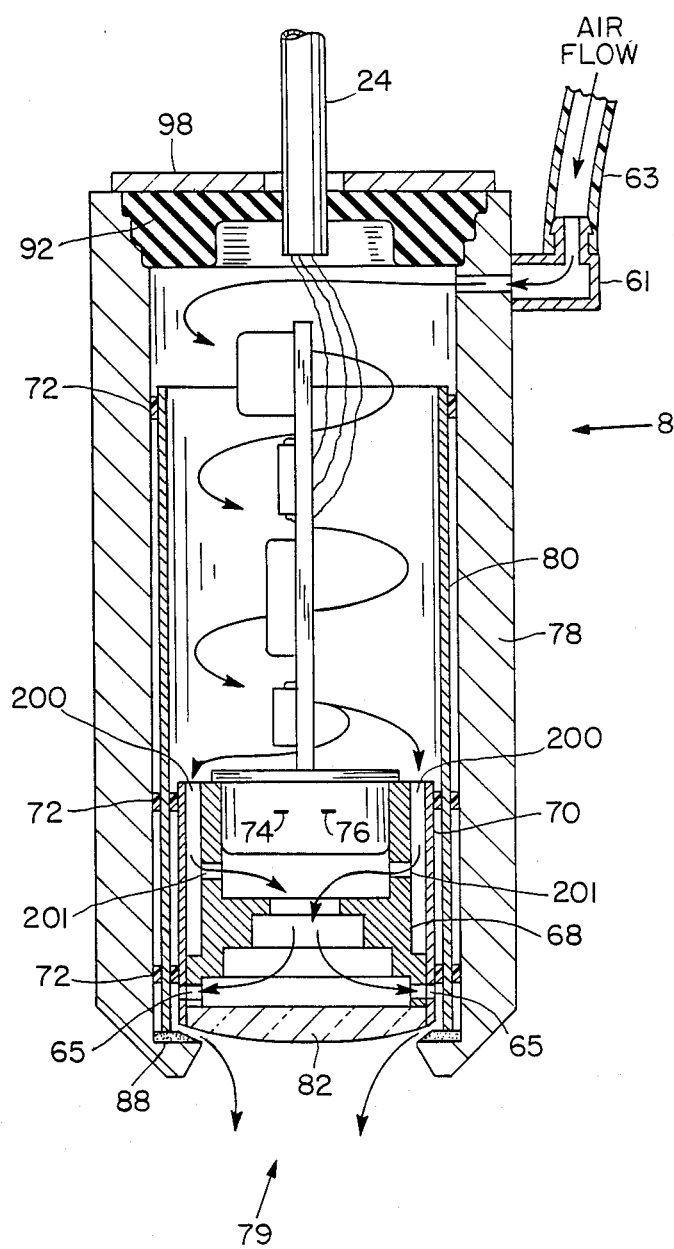
FIG. 5 is a longitudinal section of a dual element sensor with added air flow for preventing debris from entering the sensor.

The dual element sensor 10 as previously described is often faced with harsh working environments. Dust, dirt and adhesive from the immediate work area have a tendency to adhere onto the sensor. Consequently, the debris becomes collected about the aperture and lens area and hinders the performance of the device. In order to prevent such collection of debris on the lens, the present invention optionally provides air flowing out of the sensor, exhausting around the lens against any airborne potentially contaminating debris. Shown in FIG. 5 is a dual element sensor 8 with a source of pressurized air being supplied through an elbow passageway 61 at the end of the sensor unit opposite the aperture end 79. Plastic or similar tubing 63 is connected to elbow 61 and transfers air from an external source to sensor unit 8. A rubber stopper or plug 92 is squeeze fitted into the end of the sensor unit 8 opposite the aperture end 79. Plug 92 is adapted to allow sensor signal line 24 to pass into and out of sensor unit 8 and seals the end to prevent leakage of the supplied air. Cover plate 98 is screwed onto the end of housing 78 to secure the exposed end of rubber plug 92.

Air supplied at a pressure of about 3 psi and at a rate of about 0.1 scfm will provide enough flow to keep the lens 82 clear of any debris. The air flows in a path as shown by the arrows. Air passes into cavity 200 between sleeve 68 and inner tube 70 and then passes into the interior center of the plain end of sleeve 68 through holes 201. Slots 65 in the stepped end of sleeve 68 and inner tube 70 provide passage ways leading away from the interior of the plain end of sleeve 68 and around lens 82. The air then flows out through openings in washer 88 with a force great enough to prevent dirt and dust from entering sensor unit 8 but with negligible effect on heat radiated from the reference and/or target.

In addition, air supplied at a pressure of about 15 psi to about 30 psi and at a rate of about 0.5 to about 1.5 scfm and at normal room temperature of about 70° F., will cool the sensor components to allow it to function in an ambient atmosphere of up to about 500° F.

While the invention has been particularly shown and described with reference to the preferred embodiments thereof, it will be understood by those skilled in the art that various changes in form and details may be made without departing from the spirit and scope of the invention as defined by the appended claims.

We claim:

1. A radiation detector comprising:
   two thermopiles, one which senses thermal radiation of a target area at the same time the second senses thermal radiation of a reference object neighboring the target area, said thermopiles being independently amplified such that sensing of the two thermopiles is calibrated relative to each other and provides an indication of thermal difference between the target area and reference object; and
   means for displaying the thermal difference of the sensed radiations.

2. A radiation detector as claimed in claim 1 wherein a fixed gain operational amplifier is connected to one thermopile and a variable gain operational amplifier is connected to the other thermopile.

3. A radiation detector as claimed in claim 1 wherein the two thermopiles have discrete fields of view, the two thermopiles sensing thermal radiation of the target area and reference object in respective fields of view.

4. A radiation detector as claimed in claim 1 wherein the means for displaying the thermal difference includes a bar graph display having sections of different colors.

5. A radiation detector as claimed in claim 4 wherein each section provides an indication of a percentage amount of sensed thermal difference relative to a predetermined minimum thermal difference.

6. A radiation detector as claimed in claim 4 wherein the bar graph display is driven by a circuit which provides a quick initial response to sensed thermal difference and a relatively slow decay of the response.

7. A radiation detector as claimed in claim 6 further comprising an analog output of the sensed thermal difference provided before the circuit which drives the bar graph display.

8. A radiation detector as claimed in claim 4 further comprising:
a first set of LED's which correspond to the bar graph; and
a second set of LED's which correspond to the bar graph,
the first and second set of LED's positioned on opposite sides of the bar graph such that an indication of sensed thermal difference is provided on three different sides of the unit.

9. A radiation detector as claimed in claim 8 wherein the first and second set of LED's comprise 3 LED's each, one LED providing an indication of a sensed thermal difference of about 50 percent of a predetermined minimum thermal difference, a second LED providing an indication of a sensed thermal difference of about 100 percent of the predetermined minimum thermal difference, and a third LED providing an indication of a sensed thermal difference of about 150 percent of the predetermined minimum.

10. A radiation detector as claimed in claim 1 wherein the means for displaying includes an LED which remains illuminated for sensed thermal differences above a predetermined minimum thermal difference between the second thermopile sensing the target area and the one thermopile sensing the reference object.

11. A radiation detector as claimed in claim 1 wherein the means for displaying the thermal difference provides an indication of a continuously flowing and dynamic pattern of thermal differences of the heat radiation sensed by the two thermopiles.

12. A radiation detector as claimed in claim 1 wherein the means for displaying further provides an indication of difference in mass between the sensed target area and sensed reference object.

13. A radiation detector as claimed in claim 1 further comprising an electronic circuit in which an offset adjustment precedes a gain adjustment, the offset adjustment nulling offset voltage due to amplification of a sensed temperature difference signal of the two thermopiles, the gain adjustment adjusting sensitivity of the unit.

14. A radiation detector as claimed in claim 1 further comprising a separate return ground line from the two thermopiles to the display means, the separate return ground line providing a true common ground for the two thermopiles and display means.

15. A radiation detector as claimed in claim 1 further comprising a housing about the thermopiles, the housing having an interior which provides a thermally stable environment about the thermopiles such that the thermopiles sense thermal difference between the target area and reference object, uninfluenced by thermal radiation within the housing.

16. A radiation detector as claimed in claim 15 wherein the housing maintains the thermopiles at the same temperature as each other and the interior of the housing.

17. A radiation detector comprising:
two thermopiles, one which senses heat radiation of a target area at the same time the second senses heat radiation of a reference area near the target area, said thermopiles being independently amplified one by a fixed gain amplifier and the other by a variable gain amplifier, and connected such that thermal difference between the target and reference areas is generated;
a lens through which the two thermopiles sense heat radiation, the lens providing a separate and specific field of view for each thermopile; and
means for displaying the generated thermal difference, the means for displaying being remotely positioned from the two thermopiles and lens.

18. A radiation detector as claimed in claim 17 wherein the field of view of the second thermopile limits the area from which the second thermopile senses heat radiation to that of the reference area alone, without contribution of the target area.

19. A radiation detector as claimed in claim 17 wherein the lens comprises germanium which filters out waves of wavelengths less than about 1.5 microns and waves of wavelengths greater than about 21 microns.

20. A radiation detector as claimed in claim 17 further comprising filter means which allow wavelengths in the range of about 8 microns to about 13 microns to be sensed by the two thermopiles.

21. A radiation detector as claimed in claim 17 further comprising a housing for the thermopiles and lens, the housing having walls which define an interior of the housing, the walls and lens being thermally conductive so as to maintain the thermopiles and the interior of the housing at the same temperature, such that the detector is thermally stable.

22. A radiation device comprising:
two thermopiles, one which senses thermal radiation of a target area at the same time the second senses thermal radiation of a reference neighboring the target area, the thermopiles independently amplified and connected in a manner which provides an indication of thermal difference between the target area and the reference;
a housing assembly about the two thermopiles, the housing assembly having a target end through which the thermopiles sense thermal radiation of the target area and reference respectively, the housing assembly having a thermally stable interior such that the thermopiles sense a wide range of thermal differences between objects outside the target end of the housing assembly without sensing thermal radiation of the interior of the housing assembly; and
means for displaying the sensed thermal difference.

23. A radiation detector as claimed in claim 22 wherein the housing assembly comprises:
a main housing piece with a cylindrical bore;

an outer brass tube positioned coaxially within the main housing piece; the outer brass tube coupled to the main housing piece by a first coaxial plastic tubing;

an inner brass tube positioned coaxially within the outer brass tube and coupled thereto by a second coaxial plastic tubing;

a thermally conductive sleeve positioned coaxially within and in thermal contact with the inner brass tube, the sleeve housing the thermopiles within its interior and providing a heat sink to extract heat from the thermopiles so that the thermopiles are maintained at the same temperature as each other and the interior of the sleeve, the thermopiles sensing thermal radiation through one end of the sleeve.

24. A radiation detector as claimed in claim 23 wherein the heat sink of the sleeve is formed by a series of cylindrical walls decreasing in diameter from the one end of the sleeve so as to funnel thermal radiation to be sensed toward the thermopiles while extracting excessive heat from the thermopiles.

25. A radiation detector as claimed in claim 22 further comprising means for passing air through the housing assembly to cool the thermopiles and interior of the housing assembly.

26. A radiation detector as claimed in claim 22 further comprising means for passing air through the housing assembly and out the target end of the housing assembly to clear the target end of debris.

27. A radiation detector comprising:
a housing having an aperture at one end and a lens just inside the housing at the one end;
two thermopiles within the housing behind the lens, one which senses through the lens, radiation of a target area at the same time the second senses through the lens radiation of a reference area near the target area, said thermopiles independently amplified and connected in a manner that produces an indication of the thermal difference between sensed radiations;
means for passing air into said housing at an end opposite the one end and out of said housing through the aperture, the air maintaining the aperture free of debris; and
means for displaying the sensed thermal difference.

28. A radiation detector as claimed in claim 27 wherein said passing of air provides for the cooling of the thermopiles during the sensing of the temperatures of the respective target and reference areas.

29. A production line system comprising:
at one position in a production line, means for applying a thermally differentiable pattern to a substrate being moved along the production line; and
at a second position immediately subsequent to the one position, means for pattern in a manner that provides a visual indication of characteristics of the pattern as applied.

30. A production line system as claimed in claim 29 wherein said means for sensing includes a radiation detector having:
two thermopiles, one which senses present heat flux of the applied pattern at the same time the second senses heat flux of a reference object neighboring the pattern; and
display means for providing an indication of the difference between sensed heat flux of the two thermopiles.

31. A production line system as claimed in claim 30 wherein said display means provides an indication of a dynamic pattern of thermal differences of the heat flux sensed by the two thermopiles.

32. A production line system as claimed in claim 30 wherein said display means provides an indication of difference in mass between the sensed applied pattern and sensed reference object.

33. A production line system as claimed in claim 30 wherein said display means provides an indication of present thermal difference between the sensed applied pattern an sensed reference object.

34. A radiation detector comprising:
two thermopiles, one which senses thermal radiation of a target area at the same time the second senses thermal radiation of a reference object neighboring the target area, said thermopiles connected in a manner which calibrates sensing of the two thermopiles relative to each other and provides an indication of thermal difference between the target area and reference object;
a fixed gain operational amplifier connected to one thermopile and a variable gain operational amplifier connected to the other thermopile; and
means for displaying the thermal difference of the sensed radiations.

35. A radiation detector comprising:
two thermopiles, one which senses thermal radiation of a target area at the same time the second senses thermal radiation of a reference object neighboring the target area, said thermopiles connected in a manner which calibrates the sensing of the two thermopiles relative to each other and provides an indication of thermal difference between the target area and reference object;
means for displaying the thermal difference of the sensed radiations, the means for displaying the thermal difference including a bar graph display having sections of different colors, the bar graph display being driven by a circuit which provides a quick initial response to sensed thermal difference and a relatively slow decay of the response; and
an analog output of the sensed thermal difference provided before the circuit which drives the bar graph display.

36. A radiation detector comprising:
two thermopiles, one which senses thermal radiation of a target area at the same time the second senses thermal radiation of a reference object neighboring the target area, said thermopiles connected in a manner which calibrates the sensing of the two thermopiles relative to each other and provides an indication of thermal difference between the target area and reference object; and
means for displaying the thermal difference of the sensed radiations, the means for displaying further providing an indication of difference in mass between the sensed target area and sensed reference object.

37. A radiation detector comprising:
two thermopiles, one which senses thermal radiation of a target area at the same time the second senses thermal radiation of a reference object neighboring the target area, said thermopiles connected in a manner which calibrates the sensing of the two thermopiles relative to each other and provides an indication of thermal difference between the target area and reference object;

means for displaying the thermal difference of the sensed radiations; and an electronic circuit in which an offset adjustment precedes a gain adjustment, the offset adjustment nulling offset voltage due to amplification of a sensed temperature difference signal of the two thermopiles, the gain adjustment adjusting sensitivity of the detector.

38. A radiation detector comprising:

two thermopiles, one which senses thermal radiation of a target area at the same time the second senses thermal radiation of a reference object neighboring the target area, said thermopiles connected in a manner which calibrates the sensing of the two thermopiles relative to each other and provides an indication of thermal difference between the target area and reference object;

means for displaying the thermal difference of the sensed radiations; and a separate return ground line from the two thermopiles to the display means, the separate return ground line providing a true common ground for the two thermopiles and display means.

39. A radiation device comprising:

two thermopiles, one which senses thermal radiation of a target area at the same time the second senses thermal radiation of a reference neighboring the target area, said thermopiles connected in a manner which provides an indication of thermal difference between the target area and the reference;

means for displaying the sensed thermal difference; and a housing assembly about the two thermopiles, the thermopiles sensing thermal radiation o the target area and reference outside a target area of the housing assembly, the housing assembly having a thermally stable interior such that the thermopiles sense a wide range of thermal differences between objects outside the target end of the housing assembly, the housing assembly comprising:

a main housing piece with a cylindrical bore;

an outer brass tube positioned coaxially within the main housing piece, the outer brass tube coupled to the main housing piece by a first coaxial plastic tubing;

an inner brass tube positioned coaxially within the outer brass tube and coupled thereto by a second coaxial plastic tubing; and a thermally conductive sleeve positioned coaxially within and in thermal contact with the inner brass tube, the sleeve housing the thermopiles within its interior and providing a heat sink to extract heat from the thermopiles so that the thermopiles are maintained at the same temperature as each other and the interior of the sleeve, the thermopiles sensing thermal radiation through one end of the sleeve.

40. A radiation detector as claimed in claim 39 wherein the heat sink of the sleeve is formed by a series of cylindrical walls decreasing in diameter from the one end of the sleeve so as to funnel thermal radiation to be sensed toward the thermopiles while extracting excessive heat from the thermopiles.

41. A radiation device comprising:

two thermopiles, one which senses thermal radiation of a target area at the same time the second senses thermal radiation of a reference neighboring the target area, said thermopiles connected in a manner which provides an indication of thermal difference between the target area and the reference;

a housing assembly about the two thermopiles, the thermopiles sensing thermal radiation of the target area and reference outside a target area end of the housing assembly, the housing assembly having a thermally stable interior such that the thermopiles sense a wide range of thermal differences between objects outside the target end of the housing assembly;

means for displaying the sensed thermal difference; and means for passing air through the housing assembly to cool the thermopiles and interior of the housing assembly.

42. A radiation device comprising:

two thermopiles, one which senses thermal radiation of a target area at the same time the second senses thermal radiation of a reference neighboring the target area, said thermopiles connected in a manner which provides an indication of thermal difference between the target area and the reference;

a housing assembly about the two thermopiles, the thermopiles sensing thermal radiation of the target area and reference outside a target end of the housing assembly, the housing assembly having a thermally stable interior such that the thermopiles sense a wide range of thermal difference between objects outside the target end of the housing assembly;

means for displaying the sensed thermal difference; and means for passing air through the housing assembly and out to the target end of the housing assembly to clear the target end of debris.

43. A production line system comprising:

means for applying a thermally differential pattern; and means for sensing heat flux of said pattern in a manner that provides a visual indication of characteristics of the pattern as applied, the means for sensing including a radiation detector having:

two thermopiles, one which senses heat flux of the applied pattern at the same time the second senses heat flux of a reference object neighboring the pattern; and display means for providing an indication of the difference between sensed heat flux of the two thermopiles and for providing an indication of difference in mass between the sensed applied pattern and sensed reference object.

* * * * *

UNITED STATES PATENT AND TRADEMARK OFFICE
CERTIFICATE OF CORRECTION

PATENT NO. : 4,831,258
DATED : May 16, 1989
INVENTOR(S) : Raymond C. Paulk and Francesco Pompei It is certified that error appears in the above—identified patent and that said Letters Patent is hereby corrected as shown below:

Claim 29, line 6 of that claim, after "for", insert ---sensing present heat flux of said applied---.

Signed and Sealed this

Thirtieth Day of January, 1990

Attest:

JEFFREY M. SAMUELS

Attesting Officer     Acting Commissioner of Patents and Trademarks